M. V. BATCHELLER.
TIRE ARMOR.
APPLICATION FILED AUG. 19, 1915.
1,234,118.
Patented July 24, 1917.
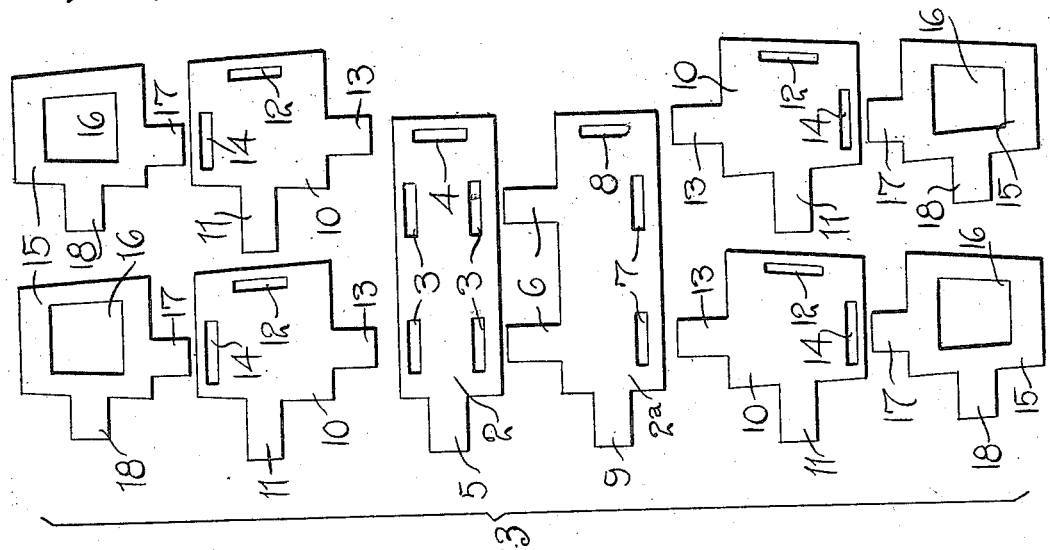
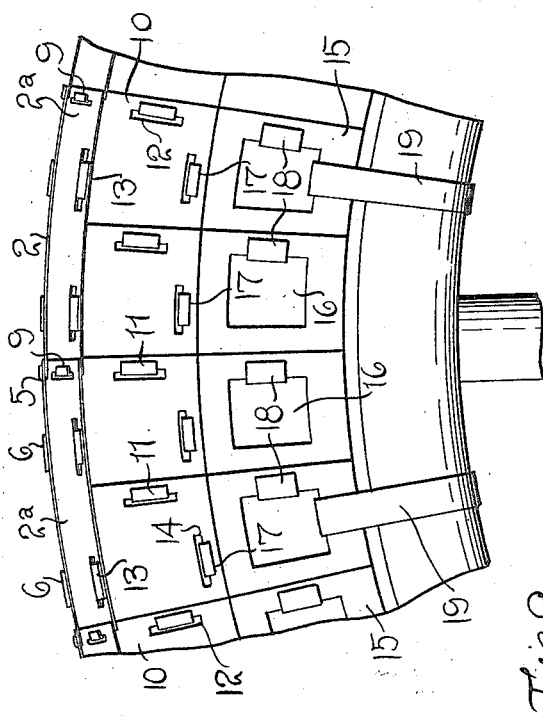
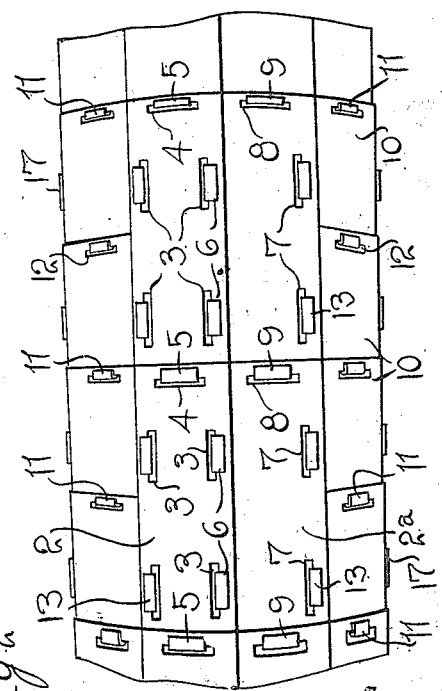
Inventor
M.V. BATCHELLER
By Watson E. Coleman
Attorney

UNITED STATES PATENT OFFICE.

MARTIN V. BATCHELLER, OF GOWRIE, IOWA.

TIRE-ARMOR.

1,234,118.  Specification of Letters Patent.  Patented July 24, 1917.

Application filed August 19, 1915. Serial No. 46,309.

*To all whom it may concern:*

Be it known that I, MARTIN V. BATCHELLER, a citizen of the United States, residing at Gowrie, in the county of Webster and State of Iowa, have invented certain new and useful Improvements in Tire-Armors, of which the following is a specification, reference being had to the accompanying drawings.

My invention relates to tire armor and the primary object of my invention is the provision of a very simply constructed, easily applied and relatively cheap armor formed of joined or interlinked sections which armor will thoroughly protect the tire from punctures and will at the same time be flexible so as to yield with the tire in traveling.

A further object of my invention is to so construct the armor that it may be readily applied and will be relatively light and may be easily held in place upon a tire.

Other objects will appear in the course of the following description.

My invention is illustrated in the accompanying drawings, wherein:

Figure 1 is a side elevation of a portion of my improved tire armor applied to a wheel;

Fig. 2 is a fragmentary top view of the construction shown in Fig. 1;

Fig. 3 is a view showing in plan all of the plates which are used to make up a section of tire armor.

Referring to these drawings it will be seen that my tire armor comprises two series of plates, designated 2 and $2^a$ disposed on each side of the middle line of the tire. The plates 2 are rectangular in form and each plate is formed adjacent its side edges with the longitudinal slots 3. One end of the plate is formed with a transverse slot 4 while the other end of each plate 2 is formed with a tongue 5. All of these plates 2 are constructed in the same manner. The plates $2^a$ are also rectangular in form and have the same size as the plates 2 but on one side are provided with the tongues 6 and on the other margin of the plates with the slots 7. The tongues 6 engage with the slots 3 of the adjacent plate 2. Each plate $2^a$ is also formed at one end with a slot 8 corresponding to the slot 4 in plate 2, and with a tongue 9 corresponding to the tongue 5 in plate 2. By means of the slots 4 and tongues 5 the plates 2 may be interlinked with each other in a longitudinally extending series, while by means of the slot 8 and tongue 9 the plates $2^a$ may be linked with each other in the same manner. The margins of the plates 2 and $2^a$ overlap each other, and the inter-engaging tongues and slots permit the plates to have a slight relative movement upon each other, in other words, secure a certain degree of flexibility.

Disposed on each side of the middle series of armor plates 2 and $2^a$ are the plates 10. Each of these plates is approximately trapezoidal and has a length equal to about one-half the length of the plates 2 and $2^a$. Each plate 10 at one end is formed with a tongue 11 and at the other end with a slot 12. One side of each plate 10 is formed with a tongue 13 and the other side with a slot 14. The tongues 13 of the plates 10 are adapted to be engaged in the slots 3 and 7 of the plates 2 and $2^a$, while the tongue 11 of each plate 10 is adapted to engage with the slot 12 of the next adjacent plate 10. These plates also overlap each other and the outer margins of the plates 10 are disposed below the lateral margins of the plates 2 and $2^a$.

Disposed along the side margins of the armor are a plurality of plates 15, each plate being narrower at its outer end than at the end adjacent the corresponding plate 10. Each of these plates 15 is cut out at its center as at 16, and each plate is formed on its edge nearest to the median line of the armor with a tongue 17 adapted to engage with the slot 14 of the adjacent plate 10. Each plate 15 is also formed at one end with a tongue 18 which as illustrated in Fig. 1 is adapted to be passed through the opening 16 and engaged over the margin of the plate. The slots 14 are sufficiently wider than the tongues 17 as to permit the tongue to have a slight oscillation within the slot, and this is true of all of the slots, this permitting a certain amount of freedom of movement and sufficient play to cause the armor to conform to the flexing of the tire. By forming the plates 15 so that their side margins taper away from the median line the armor would be caused to take a circular form corresponding to the circumferential curvature of the tire. The openings 16 furthermore not only lighten the armor and make it easy to handle but they provide means whereby straps or hooks 19 may be engaged with the armor and with the rim of the wheel, as illustrated in Fig. 1.

An armor constructed in accordance with my invention is thoroughly protective of the tire and will conform to the movement of the tire and is designed to be placed upon the tire before the inner tube is inflated so that when the tire is expanded under force of the air pressure within, the tire and armor will be caused to conform to each other and the armor be expanded with the tire. This will cause the armor to be held very firmly in place. Not only will my armor protect the tire but it will also prevent skidding as the re-turned hooks by which the plates are connected to each other will form a number of projections adapted to engage the surface of the road bed.

When the links of the armor are put together it provides a one-piece tire armor which is almost impossible to get out of place accidentally and yet which is easily removed by opening two links on each side opposite each other. By adding or removing links the armor may be made to fit any tire.

Having thus described my invention, what I claim is:

A tire armor comprising two series of plates disposed medially of the armor, one series of plates being provided with a plurality of slots along the side margins and the other series of plates being provided on one side with a plurality of tongues engaging said slots and on the other side with a plurality of marginal slots, each of the plates of both series being provided at one end with a transverse slot and at the other end with a hooked tongue engaging the tongue of the next adjacent plate, two series of laterally disposed trapezoidal plates, each plate being half the length of a plate of the two medial series of plates, each plate of said lateral series being formed on one edge with a tongue adapted to engage in a slot of the adjacent plate of the medial series and on the other side of the plate with a longitudinally extending slot, each of the laterally disposed plates being formed at one end with a hooked tongue and at the other with a slot to engage with the tongue of the next adjacent plate of the same series and two series of marginal plates, each marginal plate upon its inner end being provided with a hooked tongue engaging in the slot of the adjacent plate of the second named series and being also provided upon one edge with a hooked tongue, the plates of the marginal series being cut away at the middle, the tongue of each plate being bent over to engage through said cut-away portion, said plates being trapezoidal in form and with their shorter edges disposed outward, and means for holding the armor upon a tire.

In testimony whereof I hereunto affix my signature in the presence of two witnesses.

MARTIN V. BATCHELLER.

Witnesses:
S. F. JONES,
D. A. BATCHELLER.

Copies of this patent may be obtained for five cents each, by addressing the "Commissioner of Patents, Washington, D. C."